Nov. 21, 1961  M. H. BROOK  3,009,266
MODEL DEMONSTRATOR FOR TEACHING ARTIFICIAL RESPIRATION
Filed Sept. 21, 1960  5 Sheets-Sheet 1

Nov. 21, 1961 M. H. BROOK 3,009,266
MODEL DEMONSTRATOR FOR TEACHING ARTIFICIAL RESPIRATION
Filed Sept. 21, 1960 5 Sheets-Sheet 4
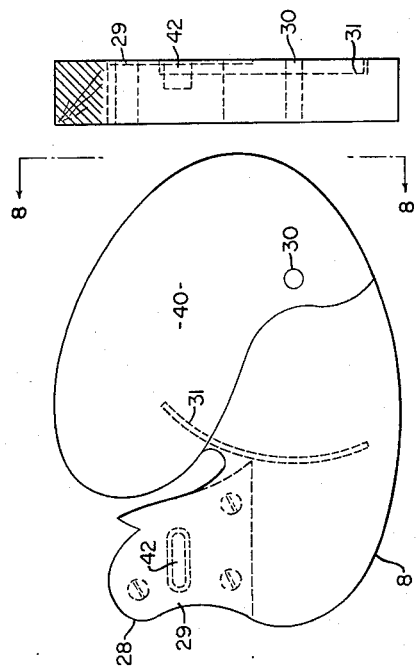
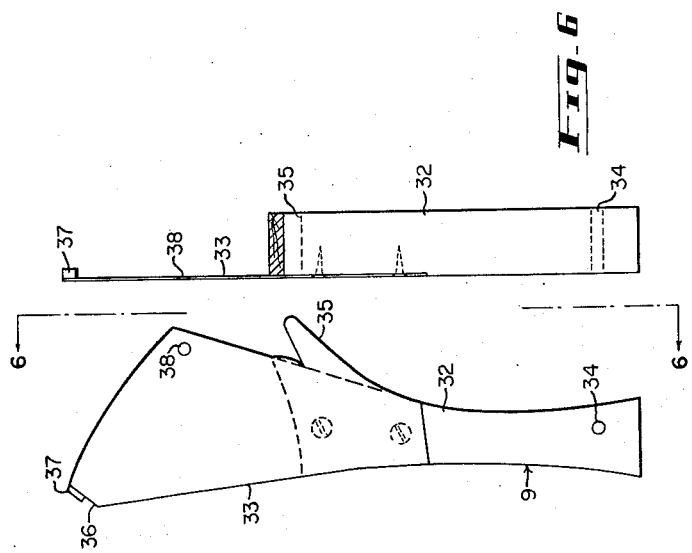

Nov. 21, 1961 M. H. BROOK 3,009,266
MODEL DEMONSTRATOR FOR TEACHING ARTIFICIAL RESPIRATION
Filed Sept. 21, 1960 5 Sheets-Sheet 5

United States Patent Office 3,009,266
Patented Nov. 21, 1961

3,009,266
MODEL DEMONSTRATOR FOR TEACHING
ARTIFICIAL RESPIRATION
Morris Harry Brook, 505 Canada Bldg., Saskatoon,
Saskatchewan, Canada
Filed Sept. 21, 1960, Ser. No. 57,473
Claims priority, application Canada July 28, 1960
11 Claims. (Cl. 35—17)

This invention relates to anatomical models and more particularly to models of the head and neck.

It has been stated that, in the case of accident victims, the method of resuscitation employed must be easy to learn and easy to apply in any type of situation without any special apparatus, must require little energy to perform effectively, must be completely harmless and should if possible avoid aesthetic or hygenic objections.

Direct artificial respiration techniques, such as "mouth-to-mouth" resuscitation, are now becoming widely recognized as being the most effective method of administering artificial respiration. One objection to this method, however, is that aesthetic difficulties arise both in applying and teaching this method, due to the problem of the communication of diseases, and the absence of a satisfactory training technique.

By the resuscitator which is the subject-matter of Canadian Patent No. 574,736 issued on April 28, 1959, it is believed that the above disadvantage is overcome. However, the problem of teaching still remains.

It is well known in an unconscious individual that the tongue will normally assume a position such that it blocks the pharynx. This prevents respiration, and as a first measure in any type of artificial respiration technique it is essential that the patency of the respiratory tract be assured. A technique for this purpose, originally disclosed by Dr. William Tossach in 1744 has recently been rediscovered. This technique requires that the victim be placed in a supine horizontal position; the throat be cleared of secretion, vomitus, etc.; the head be tilted back into the "sniffing" position; and the lower jaw be elevated with the thumb and index finger. By this method the tongue is moved whereby the pharynx is unblocked so that air may pass quite freely into the victim's lungs. The technique which has just been described is not widely known and it is therefore an object of the present invention to provide a model of a human head and neck for demonstrating the form and relationships of the several organs and parts which constitute and border the upper respiratory tract so that the facility and effectiveness of this technique may be more readily recognized and also to assist training assistants with the abovementioned type of resuscitator.

Accordingly this invention relates to a model of a human head and neck in sagittal section for demonstrating a method of assuring patency of the pharynx which comprises: a support; a first part constituting a neck having a nape and upper oesophagus representations thereon; said first part being hingedly connected to said support; a second part constituting a head including lower jaw and lower lip portions and pharyngeal passage representations thereon; said second part being hingedly connected to said first part adjacent said nape representation; a third part having lower jaw and tongue representations thereon, said third part being hingedly connected to said second part adjacent said lower lip portion, said third portion normally assuming a position whereby said tongue representation blocks said pharynx; and a fourth part representing an epiglottis and thyroid cartilage hingedly connected to said third part whereby rearward tilting of said first part urges said third part and the tongue representation thereon forwardly thereby assuring patency of the pharynx.

The invention is illustrated by way of example, in the accompanying drawings in which:

FIG. 5 is a side view of that part of FIG. 1 which constitutes the epiglottis and the front wall of the neck;

FIG. 6 is an end view taken on the line VI—VI of FIG. 5;

FIG. 7 is a side view of that part of FIG. 1 which constitutes the tongue and lower jaw;

FIG. 8 is an end view taken on the line VIII—VIII of FIG. 7;

Figure 1:
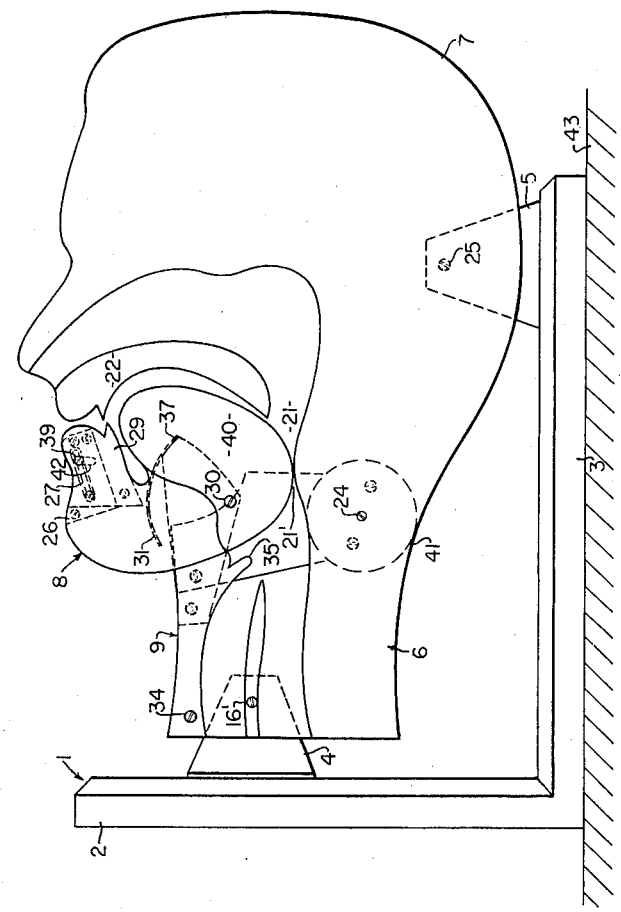
FIG. 1 is a side view of the model constructed and arranged in accordance with the invention, in a normal position.
Figure 2:
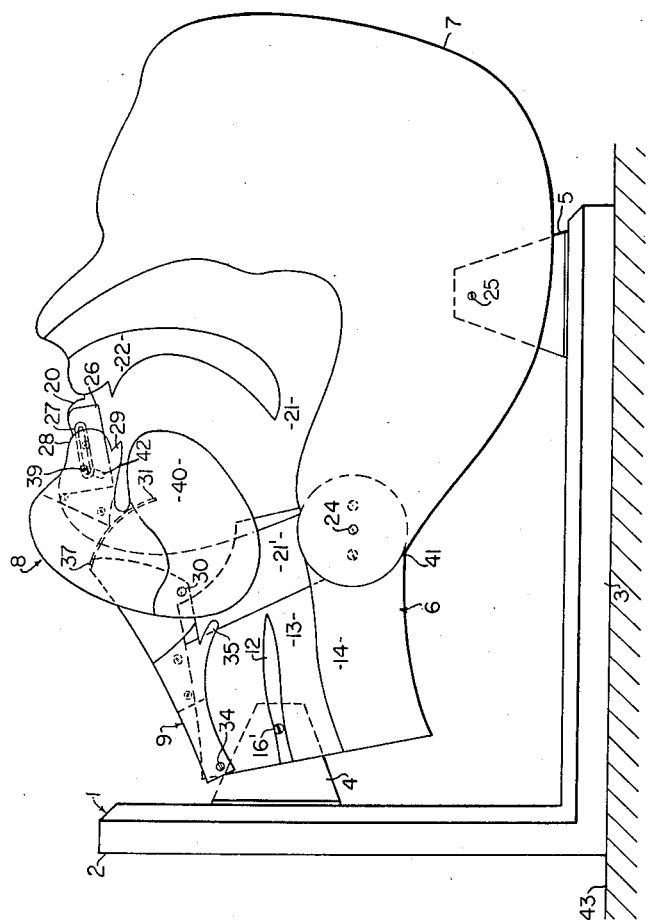
FIG. 2 is a side view of the model illustrated in FIG. 1 in an extended position.

For the purpose of this description the position of the model shown in FIG. 1 may be described as being in the "normal" position, and the position of the model shown in FIG. 2 as being in the "extended" position. In other words, FIG. 1 illustrates the relationship between the various organs and parts which constitute the upper respiratory tract in an unconscious individual and shows the tongue blocking the pharynx; and FIG. 2 illustrates the relationship of these several organs and parts when the head is tilted back in accordance with the described technique. As will be seen from FIGS. 3 to 10 the model has essentially three dimensions, and for teaching purposes it will be assumed to have no depth. As shown in FIGS. 1 and 2 a support 1, comprising two members 2 and 3 terminally joined to form a right-angle, is provided for the model. On members 2 and 3 two pivot posts, shown respectively at 4 and 5, are mounted and in each of these posts a pivot hole is provided so that the model may be hingedly secured thereto.

As shown in the preferred embodiment illustrated in the drawings the model itself has a part 6 which represents the neck; a part 7 which represents the head including a lower jaw 19 and a lower lip 20; a part 8 which represents the tongue 40 and lower jaw; and a part 9 which represents the thyroid cartilage and epiglottis 35.

Figure 10:
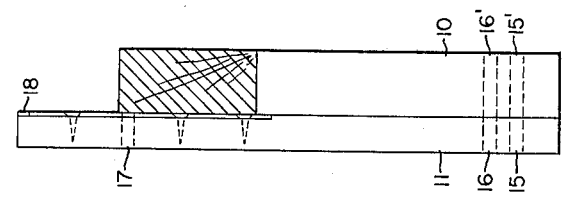
FIG. 10 is an end view taken on the line X—X of FIG. 9.
Figure 9:
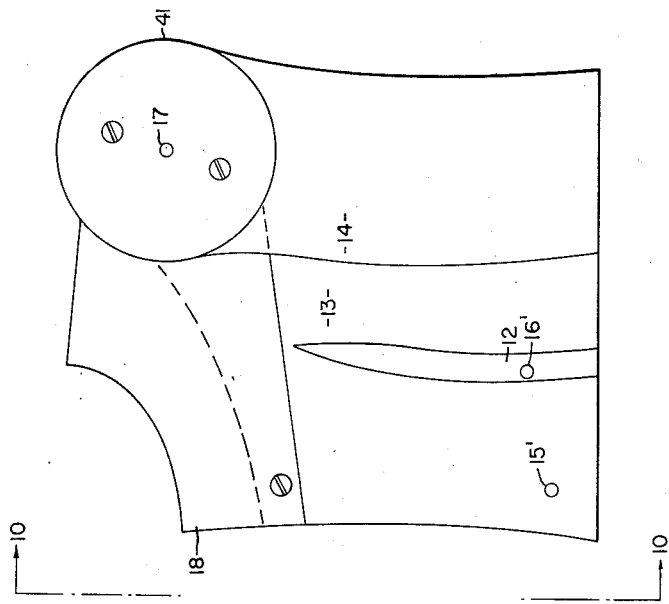
FIG. 9 is a side view of that part of FIG. 1 constituting the neck.

The neck 6 is shown in greater detail in FIGS. 9 and 10. It comprises two parts 10 and 11 having substantially the same contours on three sides, and these two parts are immovably secured together so that their corresponding sides are co-planar. However, the first of these parts 10 has a greater depth and extends upwardly for a lesser distance than 11. It will be noticed that the depth of 10 is substantially equal to the depth of the tongue and lower jaw 8 and similarly jaw 8 has a depth substantially equal to the depth of lower jaw 19 of head 7. By this arrangement there will be no projections from the surface of the model and the coacting parts will move in the same vertical plane.

On 10 as shown in FIG. 9 the cricoid cartilage is indicated at 12, the upper oesophagus is shown at 13, and the cervical spine at 14. Two pivot holes 15 and 16 are provided in 11 and two corresponding holes 15' and 16' are provided in 10 so that when parts 10 and 11 are assembled pivot holes 15 and 15', and 16 and 16' are aligned. A further pivot hole 17 is provided on 11 adjacent the nape 41 thereof and a brass plate 18 is secured to the upper portion of 11 so that the friction between the neck 6 and the jaw 8, and the neck 6 and head 7, is reduced to a minimum. While the cross-hatching of the sectional views indicates wood it will of course be understood that other materials may be used. If plastics or similar low friction materials are employed then the brass plates such as 18 may be dispensed with.

Figure 3:
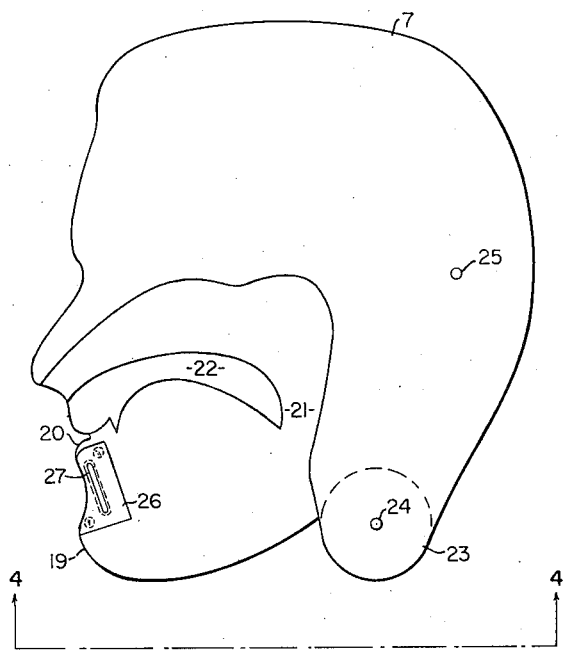
FIG. 3 is a side view of the head part of FIG. 1.
Figure 4:
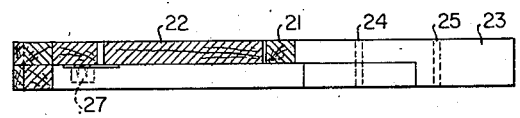
FIG. 4 is an end view taken on the line IV—IV of FIG. 3.

FIGS. 3 and 4 show the structure of the head 7. In contour it represents a head including a lower jaw 19. The lower lip is indicated at 20, the naso-pharynx at 21 and the maxilla at 22. The maxilla 22 and the lower jaw 19 are in two different planes so that when the jaw 8 is secured to head 7, in a manner which will be described, the surfaces which the jaw 8 and the head 7 present to the student are in the same plane. From the base of the head 7 a substantially arcuate projection 23 extends downwardly. A pivot hole 24 is provided in this projection and when assembled this hole 24 is aligned with pivot hole 17 of neck 6. A further pivot hole 25 is provided at the rear of the head 7, and adjacent the lower lip 20 thereof a brass plate 26 is secured. This brass plate has a longitudinal slot 27 therein which inclines downward substantially along a line between the tip of the nose and the pivot point 15 when the model is in a normal position.

In FIGS. 7 and 8 the structure of part 8 which represents a tongue and lower jaw is illustrated. The lower lip is indicated at 28 and the tongue is shown at 40. A brass plate 29 is secured to the lower lip. As on the brass plate 26 of the head 7, a slot 42 is provided on brass plate 28. However, while the two brass plates 29 and 26 are mutually opposed, slot 42 is substantially parallel to base member 2 when the model is in the normal position. A pivot hole 30 is provided in the tongue adjacent the rear thereof and a substantially arcuate slot 31 extends from the tongue into the lower jaw. This slot has its radial centre in the pivot hole 30.

Part 9, as mentioned previously represents the thyroid cartilage and the epiglottis. As will be seen from FIGS. 5 and 6 it has a lower portion 32 and an upper portion 33. The lower portion 32 is provided with a pivot hole 34 adjacent its base and the epiglottis is represented by 35. The upper portion 33 is irregular in form but generally conforms at its lower end with the upper end of the lower portion 32 to which it is rigidly secured. However, the upper portion 33 is formed from a brass plate of a reduced depth compared to the depth of the lower portion 32 which is of wood. On the leading edge 36 of the upper portion 33 there is a laterally projecting key 37 and towards the rear of 33 a pivot hole 38 is provided. The height that the upper portion 33 extends above the lower portion 32 is such that when the model is tilted to the extended position, the jaw part 8 may move round without being impeded by the lower portion 32, FIG. 2, the extended position, shows the structure of the assembled model clearly. The neck 6 is pivotally secured to pivot post 4 by a pin passing through the pivot hole in the post and the aligned holes 16 and 16' of the neck. The neck 6 is secured to the head 7 by aligning the respective pivot holes 17 and 24 and passing a suitable pin therethrough. The head is also secured to pivot post 5 on the base member 3 by aligning hole 25 with the pivot hole of the post and securing with a pivot pin. The tongue and lower jaw part 8 is pivotally secured to the head 7 by a pin 39 which engages both slots 42 and 27 in the lower jaw and tongue part 8 and head 7 respectively. The lower jaw and tongue 8 is pivotally secured to the thyroid cartilage and epiglottis part 9 by a pivot pin passed through aligned pivot holes 30 and 38 in these parts respectively. The lateral key 37 on the thyroid and epiglottis part 9 is also engaged with the slot 31 of the tongue and lower jaw 38. The thyroid and epiglottis part 9 is in turn pivotally secured to the neck 6 by a pivot pin passed through the aligned holes 34, 15 and 15' respectively.

For demonstration the model is placed on a bench or table 43 as shown in FIG. 1 in a face-up normal position. In this position the model clearly demonstrates that in an unconscious individual the tongue blocks the pharynx and air is unable to pass to the lungs. The head 7 is then tilted by an upward pressure at the nape of the neck or by applying pressure on the lower jaw 8. As the pressure is applied the neck 6 and the head 7 will pivot about their respective points of support. At the same time the thyroid and epiglottis 9 will pivot about 34 and cause the lower jaw and tongue 8 to turn about pivot hole 30 which will move forward. As this movement takes place the key 37 will move round slot 31. Simultaneously, as head 7 tilts rearwardly the lower lip 20 on head 7 will move toward the right of the page and will assume an attitude almost parallel with member 3 of the support. The lower lip 28 on the lower jaw and tongue 8 will also move slightly towards the right of the page but engagement between the two lower lips is maintained by pin 39 engaging slots 27 and 42 of plates 26 and 28 respectively. When these movements have been completed the several parts of the model will have assumed the positions shown in FIG. 2 and the effectiveness of the technique will have been demonstrated by the patency of the pharynx 21.

What is claimed is:

1. A model of a human head and neck in sagittal section for demonstrating a method of assuring patency of the pharynx which comprises: a support; a first part constituting a neck having a nape and upper oesophagus representations thereon; said first part being hingedly connected to said support; a second part constituting a head including lower jaw and lower lip portions and pharyngeal passage representations thereon; said second part being hingedly connected to said first part adjacent said nape representation; a third part having lower jaw and tongue representations thereon, said third part being hingedly connected to said second part adjacent said lower lip portion, said third part normally assuming a position whereby said tongue representation blocks said pharynx; and a fourth part representing an epiglottis and thyroid cartilage hingedly connected to said third part whereby rearward tilting of said first part urges said third part and the tongue representation thereon forwardly thereby assuring patency of the pharynx.

2. A device as claimed in claim 1 in which said support comprises a first member and a second member secured together to form a right angle, said first part being hingedly connected to said first member of said support and said second part being hingedly connected to said second member of said support.

3. A device as claimed in claim 1 in which all said hinged connections are in the same plane.

4. A device as claimed in claim 1 in which the hinged connection between said third part and said fourth part is operable in response to hingeable movement of any of said remaining parts.

5. A model of a human head and neck in sagittal section for demonstrating a method of assuring patency of the pharynx which comprises: a support; a first part constituting a neck having a nape and upper oesophagus representations thereon; said first part being hingedly connected to said support; a second part constituting a head including lower jaw and lower lip portions and pharyngeal passage representations thereon; said second part being hingedly connected to said first part adjacent said nape representation; a third part having lower jaw and tongue representations thereon, said third part being hingedly connected to said second part adjacent said lower lip portion, said third part normally assuming a position whereby said tongue representation blocks said pharynx; a fourth part representing an epiglottis and thyroid cartilage hingedly connected to said third part whereby rearward tilting of said first part urges said third part and the tongue representation thereon forwardly thereby assuring patency of the pharynx, said hinged connection between said third part and said fourth part being operable in response to hingeable movement of any of said remaining parts; and limiting means for restricting the amount of relative motion between said third and fourth parts.

6. A device as claimed in claim 5 wherein said limiting means includes a laterally extending key on said fourth part engageable with a slot formed in said third part.

7. A model of a human head and neck in sagittal section for demonstrating a method of assuring patency of the pharynx which comprises: a support; a first part constituting a neck having a nape and upper oesophagus representations thereon; said first part being hingedly connected to said support; a second part constituting a head including lower jaw and lower lip portions and pharyngeal passage representations thereon; said second part being hingedly connected to said first part adjacent said nape representation; a third part having lower jaw and tongue representations thereon, said third part being hingedly connected to said second part adjacent said lower lip portion, said third part normally assuming a position whereby said tongue representation blocks said pharynx; a fourth part representing an epiglottis and thyroid cartilage hingedly connected to said third part whereby rearward tilting of said first part urges said third part and the tongue representation thereon forwardly thereby assuring patency of the pharynx; said fourth part comprising a lower portion and an upper portion, rigidly secured together, said upper portion of said fourth part having a leading edge and a reduced depth relative to said lower portion of said fourth part whereby said third part may pivot unimpeded about the hinged connection between said third part and said fourth part.

8. A device as claimed in claim 7 in which said third part has an arcuate slot therein, said slot having its radial centre at the hinged connection between said third and fourth parts.

9. A device as claimed in claim 1 wherein said fourth part includes a lower portion and an upper portion rigidly secured together, said upper portion of said fourth part having a leading edge and a reduced depth relative to said lower portion of said fourth part whereby said third part may pivot unimpeded about the hinged connection between said third part and said fourth part; said third part having a slot therein; said leading edge on said fourth part having a laterally extending key thereon registrable with said slot in said third part to limit the amount of motion of the hinged connection between said third and fourth parts.

10. A device as claimed in claim 1 having an axis extending through the hinged connection between said first part to said support wherein said second part has a longitudinal slot adjacent the lower lip portion thereof inclined to said axis; said third part also having a longitudinal slot adjacent the lower jaw representation thereof, said latter longitudinal slot being parallel with said axis; said slots being mutually opposed to one another at least at one point; and a pin connecting said slots.

11. A device as claimed in claim 1 wherein said third part and said second part each have mutually opposed portions, said third part and said fourth part each have mutually opposed portions, said third and first parts each have mutually opposed portions, all of said mutually opposed portions being with low-friction surfaces.

References Cited in the file of this patent

Catalog No. 3, Title: "Accident Victims for Realistic First-Aid Training," published September 1959, pages 1, 2, 3, 4.